United States Patent [19]

Suzuki et al.

[11] Patent Number: 5,508,578
[45] Date of Patent: Apr. 16, 1996

[54] STATOR UNIT OF FLAT MOTOR

[75] Inventors: Yuzuru Suzuki, Shizuoka; Sakae Fujitani, Hamamatsu; Masaaki Inagaki, Shizuoka, all of Japan

[73] Assignee: Minebea Company Limited, Nagano, Japan

[21] Appl. No.: 324,493

[22] Filed: Oct. 18, 1994

Related U.S. Application Data

[63] Continuation of Ser. No. 61,053, May 14, 1993, abandoned.

[30] Foreign Application Priority Data

May 15, 1992 [JP] Japan .................................. 4-148572

[51] Int. Cl.⁶ .................................................... H02K 1/12
[52] U.S. Cl. ............... 310/254; 310/42; 310/43; 310/45; 310/71; 310/218
[58] Field of Search ................... 310/268, 67 R, 310/43, 45, 179, 218, 254, 179, 71, 180, 184, 198, 195, 42; 29/596

[56] References Cited

U.S. PATENT DOCUMENTS

| | | | |
|---|---|---|---|
| 4,471,247 | 9/1984 | Cotton | 310/45 |
| 4,529,900 | 7/1985 | Uzuka | 310/43 |
| 4,634,908 | 1/1987 | Sturm | 310/45 |
| 4,783,608 | 11/1988 | Gruber | 310/67 R |
| 4,814,651 | 3/1989 | Elris | 310/67 R |
| 4,818,911 | 4/1989 | Taguchi et al. | 310/43 |
| 4,823,034 | 4/1989 | Wrobel | 310/67 R |
| 4,965,476 | 10/1990 | Lin | 310/67 R |
| 5,008,573 | 4/1991 | Beppu | 310/67 R |
| 5,030,864 | 7/1991 | Van Hout | 310/67 R |
| 5,134,327 | 7/1992 | Sumi et al. | 310/43 |
| 5,138,209 | 8/1992 | Chuta | 310/67 R |
| 5,173,628 | 12/1992 | Yoshida | 310/67 R |
| 5,220,227 | 6/1993 | Ohi | 310/67 R |
| 5,252,873 | 10/1993 | Hamamoto et al. | 310/67 R |
| 5,323,074 | 6/1994 | Sakashita et al. | 310/43 |

Primary Examiner—R. Skudy
Attorney, Agent, or Firm—Staas & Halsey

[57] ABSTRACT

During the assembly of a small motor, insulation is installed on the outer surface of a magnetic pole. An armature coil is wound so that the wire does not touch the corners of the magnetic pole. The wound coil does not loosen and sufficient insulation for the armature coil and magnetic pole gap can be secured when the assembly is completed. This allows as much ampere turn of the armature coil as possible to be obtained. Moreover, the thickness of the motor can be made flatter resulting in easier assembly of the flat motor's stator.

7 Claims, 4 Drawing Sheets

STATOR UNIT OF FLAT MOTOR

This application is a continuation of application Ser. No. 08/061,053, filed May 14, 1993, now abandoned.

BACKGROUND OF THE INVENTION

1. Field of the Invention

The present invention relates to a flat motor stator, which provides an especially simple construction of armature coil insulation, and furthermore relates to the very easy assembly of the flat motor stator.

2. Description of the Prior Art

The newest tape recorders, photocopiers and other electronic apparatus follow a trend in downsizing and lighter weight requirements of users and improvements in capacity requirements.

This is accompanied by motors that are used in electronic apparatus that are becoming thinner and smaller in size.

When the motor is made smaller or flatter, a problem arises as to the armature coil insulation. That is the way the armature coil is wound on the magnetic pole stator, the insulation membrane coating a conducting wire of the armature coil is damaged when it contacts the magnetic pole surface.

Also to prevent the insulation space between the armature coil and the magnetic pole from being torn, a bobbin is provided for the magnetic pole. But since the motor is made smaller and flatter, this bobbin can not be fitted on the magnetic pole. Thick synthetic resin membranes are then adhered to the whole stator instead of the bobbin. Sometimes tapes are affixed to the magnetic poles. As a result, there is not enough space to wind the armature coil winding on the magnetic poles, so that the coil can not have many windings.

Another problem arises with respect to a treatment of the armature coil end. Normally, to prevent the armature coil winding on the magnetic pole from loosening, the armature coil is temporarily fastened by application or adhesive of varnish or sealing wax, etc., on the wound armature coil. Consequently, in a case where the armature coil's terminal is entwined with something during assembling of the motor and a pulling force is applied the end of the wire becomes detached from the armature coil. The varnish and sealing wax peel off and the armature coil is wound with difficulty and is rewound during the manufacture of the motor.

SUMMARY OF THE INVENTION

It is an object of the present invention to provide a stator unit with a flat motor having a wound coil which does not loosen.

Another object of the present invention is to provide a stator unit with a flat motor which has a sufficient insulation gap between the armature coil and each magnetic pole when the wound coil is finished.

Still another object of the present invention is to provide a stator unit with a flat motor which obtains as many ampere turns of the armature coil as possible.

Another object of the present invention is to provide a stator unit with a flat motor which makes it easier for assembly due to forming flatter forms in comparison with the conventional art.

To achieve the above objects of the present invention, there is provided a stator unit with a flat motor wound around the armature coil on a plurality of magnetic poles arranged protrusively in circular shape from a ring-shaped yoke made of strongly magnetized material. The winding of the stator coil on both sides of the magnetic poles forms a thicker insulation formation than the flat motor construction requires.

The flat motor has armature coil insulation and forms a flat construction, moreover, the coil does not loosen at the time of assembly.

DESCRIPTION OF THE PREFERRED EMBODIMENTS

An embodiment of the present invention will hereinafter be described in detail with respect to the drawings.

Figure 1:
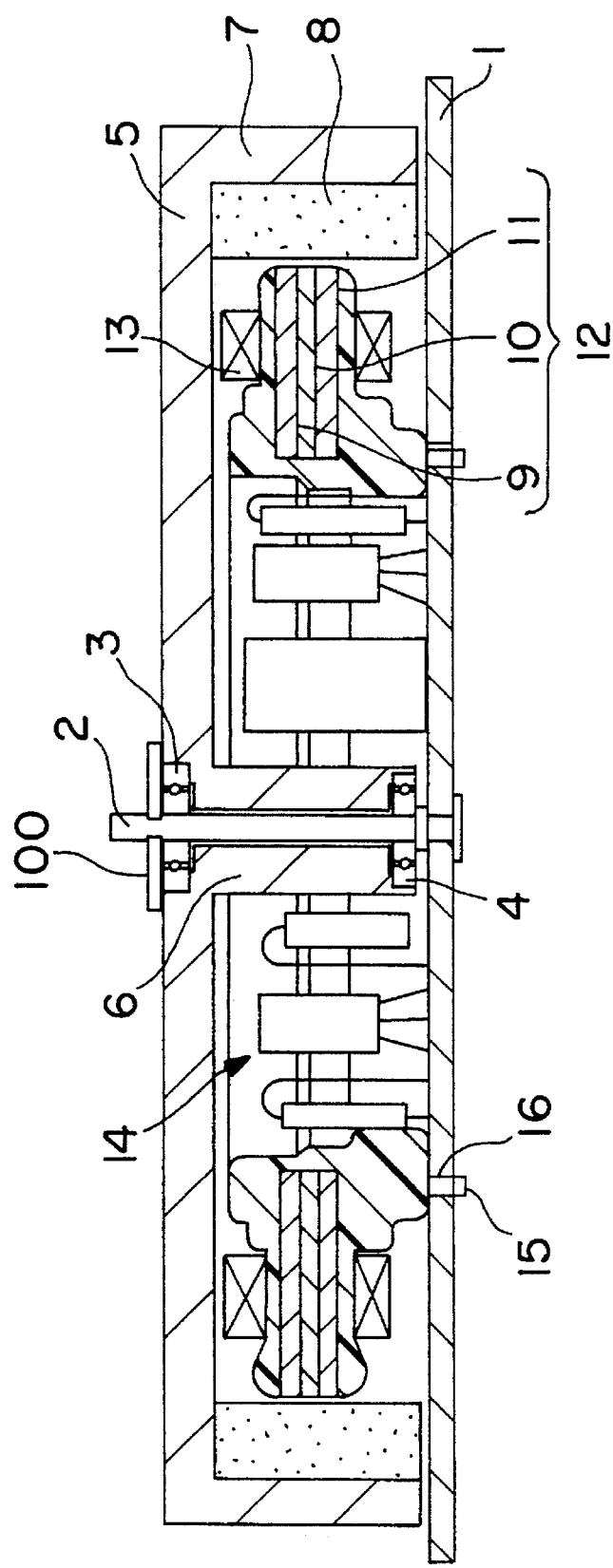
FIG. 1 is a cross-sectional view of a flat motor according to a first embodiment of the present invention.

FIG. 1 is a cross-sectional view of an auto-rotor type flat motor according to a first embodiment of the present invention. In FIG. 1, 1 denotes a motor base plate made form a printed circuit board. In the centre of the motor base plate 1, axle 2 is installed. In the axle 2, an auto-rotor 5 rotates freely on the axle 2 through bearings 3 and 4. A centre bearing 6 is in the middle of the auto-rotor 5. On the inside of the bearing 6, previously mentioned bearings 3 and 4 are arranged. On the inside of the outer wall 7 of the auto-rotor 5, a ring shaped magnet 8 made of ferrite is installed. On the inside of the auto-rotor 5, a ring-shaped yoke 9 is arranged inside, and a stator core 12 equipped with a plurality of magnetic poles 10 having multiple poles 11 protruding circularly from the outside wall is arranged. The stator core 12 includes the ring-shaped yoke 9, magnetic pole 10 and multiple poles 11-housing three layers of silicon-steel sheets. The armature coil 13 is wound around the magnetic pole 10 (a drawing is not shown). The construction of stator core 12, which is included in the armature coil 13 will be discussed later. In the free space between the center bearing and the ring-shaped yoke 9 of the stator core 12, electronic equipment 14 needed to drive the motor is arranged. Needless to say, the aforementioned stator core 12 may be made with ferrite, however a composition including silicon-steel sheet is also suitable.

Figure 2:
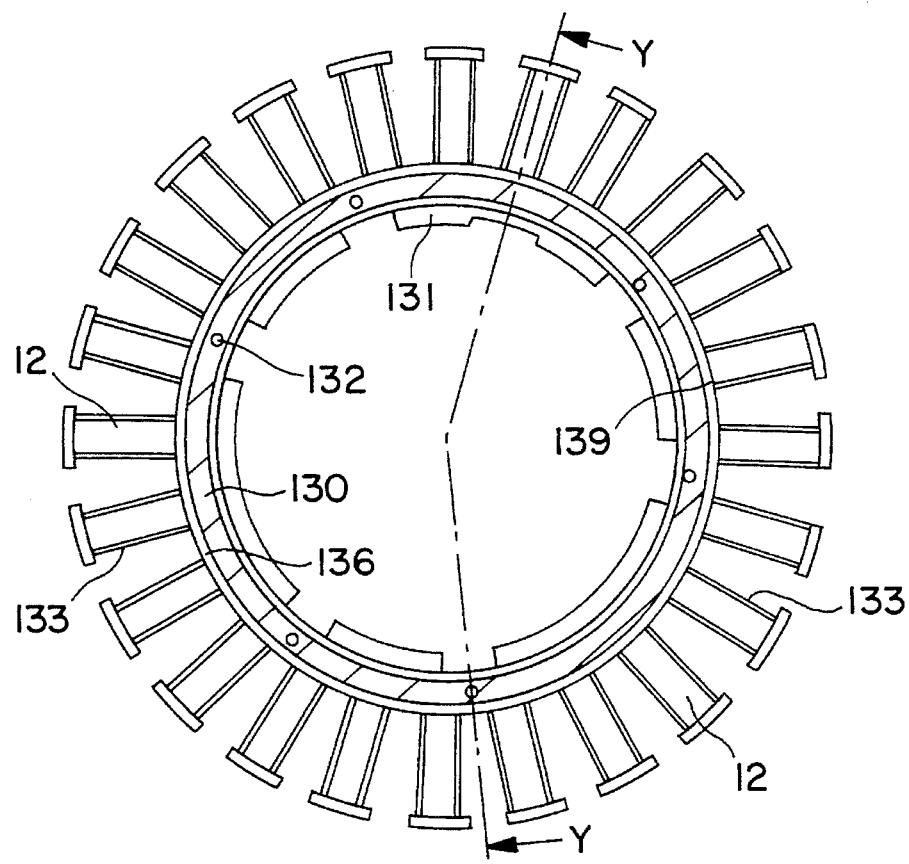
FIG. 2 is a front view of a stator coil.
Figure 3:
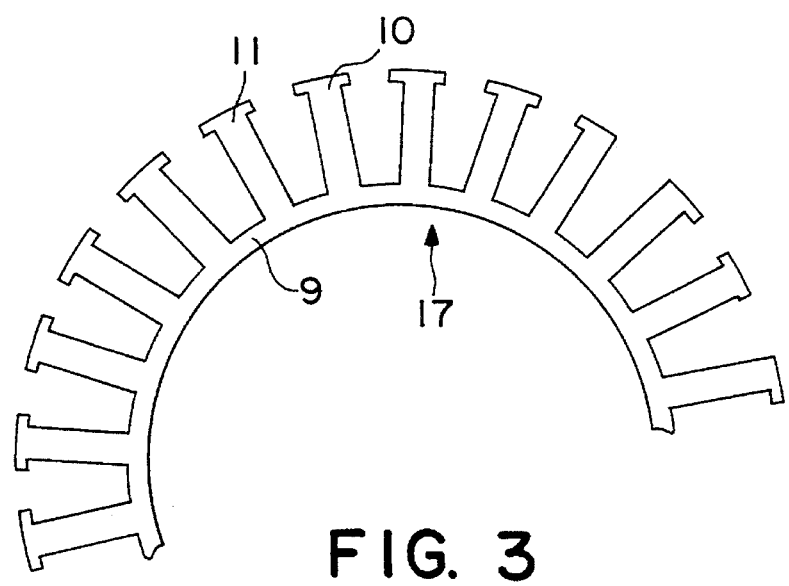
FIG. 3 is a fragmentary front view of a magnetic pole made of a silicon-steel sheet and part of a yoke.

FIG. 2 is a front view of the stator core 12 according to the present invention. The stator core 12 includes the ring-shaped yoke 9, magnetic poles 10 and multiple poles 11 laminated with three layers of a silicon-steel sheet 17 as a core shown in FIG. 3. Using a synthetic resin insert-mold process, yoke 9 is covered with an inside frame 130 made of synthetic resin. Two side surfaces of magnetic pole 10 are adhered at the same time with a thin layer insulation 133 during the insert mold-process.

Figure 4:
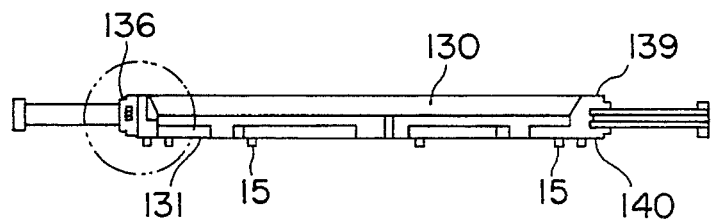
FIG. 4 is a cross-sectional view of FIG. 2 cut along the line Y—Y.
Figure 5:
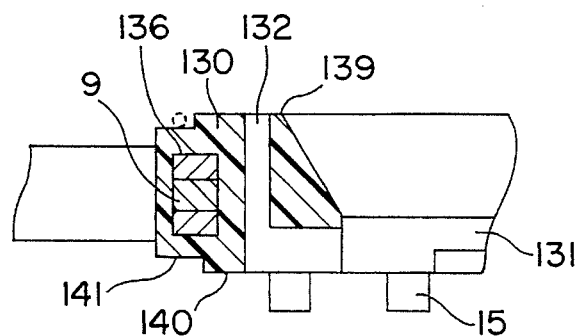
FIG. 5 is an enlarged cross-sectional view of the part circled with a chain line of FIG. 4.
Figure 6:
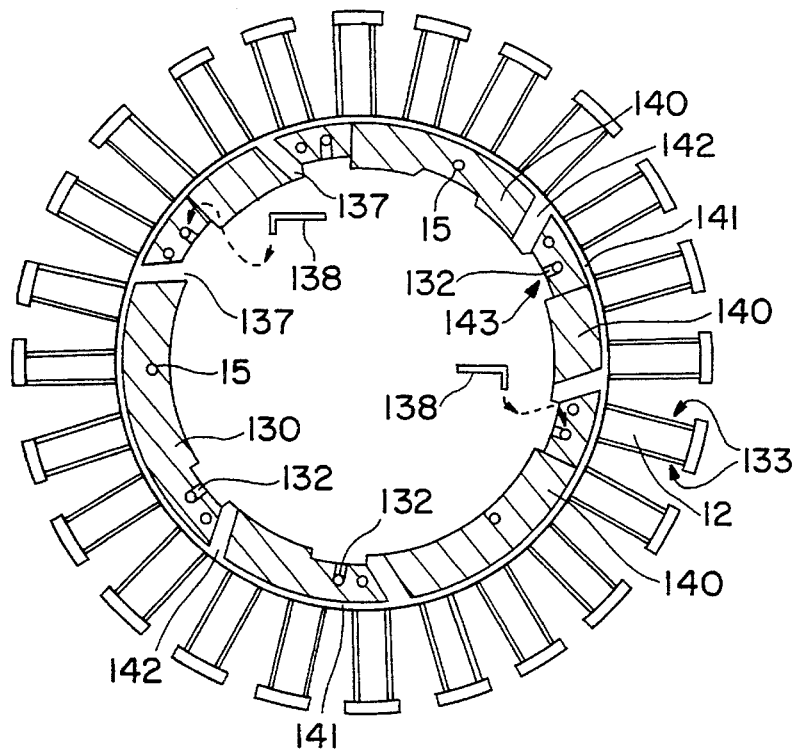
FIG. 6 is a bottom view of a stator core.

FIG. 4 is a cross-sectional view cut along the line Y—Y in FIG. 2. FIG. 5 is an enlarged cross-sectional view of the part circled by the two-dotted line in FIG. 4. FIG. 6 is a bottom view of the stator core 12. The flat outside support 139 on the surface of the inner frame 130 is formed at the same time as the outside edge 136. The outside edge 136 connects one magnetic pole with the next magnetic pole as a lead wire. On the inside surface of the inner frame 130, as shown in FIG. 6, a flat inner support 140 is provided (slanted area in FIG. 6).

Furthermore, as shown in FIGS. 2, 4, 5 and 6, fins 131 provided on the inside of frame 130 are arranged toward the center direction. The inner frame 130 is equipped with small holes, penetrating from an upper to a lower surface and the L-shaped pins 138 (FIG. 6) as the terminals of armature coil 13 are formed as they are inlaid. Reference numeral 15 denotes a boss protruding on the flat inner support 140 of the inner frame 130, which determines the position of the previously mentioned motor base plate 1. Furthermore, on the outer edge of the flat inner support 140, the outer ledge 141 for the same purpose as the outer ledge 136 are formed. At the same time, grooves 142 are formed toward the surface of the inner periphery from the surface of outer periphery of inner frame 130. The bottom of these grooves 142 match equally deep ones on the surface of flat inner support 140. The grooves 142 provide a path for the terminals of the armature coil 13. The outlets of the small holes 132 on the inner surface of the stator core 12 form terminal inserts 143 which are in laid into the L-shaped pins 138.

Figure 7:
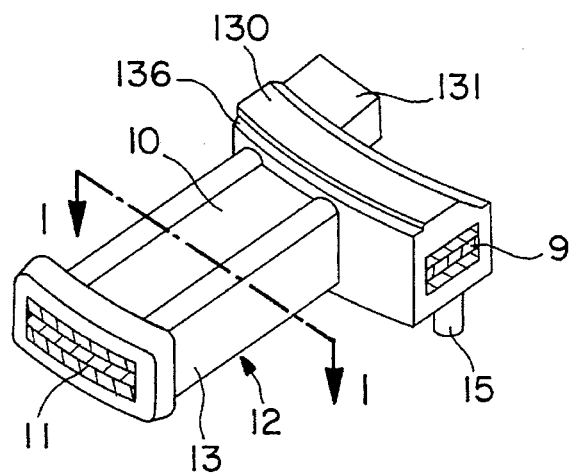
FIG. 7 is a fragmentary perspective view showing a single magnetic pole of a stator core.
Figure 8:
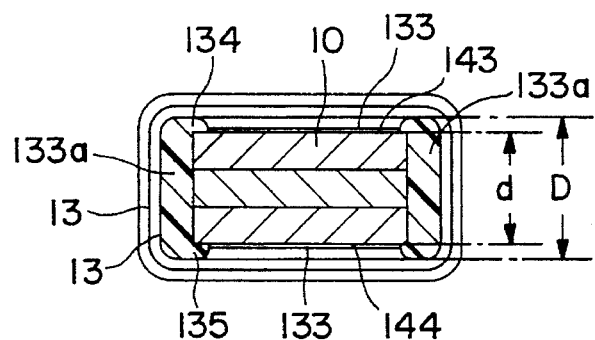
FIG. 8 is a cross-sectional view of a section cut along the line A—A of FIG. 7.

FIG. 7 is a partial perspective view showing a magnetic pole 10 of the core 12. FIG. 8 shows a cross-sectional view of FIG. 7 cut along line 1—1. As described above, in these drawings, the thin insulation layer 133 is formed at the time of the insert-mold process on both sides of the magnetic pole 10. The vertical height D pole 10, including the insulator layer 133 is, for example, 0.2 mm greater than the thickness of the core which is laminated with three silicon steel plates (see FIG. 8). When the armature coil 13 is wound onto the magnetic pole 10, contact between the corners of the magnetic pole 10 and the lead wire of the armature coil 13 is prevented. Also, it is possible that the upper and lower edges of the thin insulation layer 133 are wound and then the upper edge 134 and the lower edge 135 are formed. The reference numeral 133a thicker portion including the upper edge 134 and lower edge 135. Normally, the upper and the lower parts of the surface of the magnetic pole 10 stand out. These portions can be covered with the terminal inserts 143 and 144, having a thickness of at least 0.1 mm by electro-plating. The thickness protruding from the portions of the magnetic pole 10 is sufficiently small the height which corresponds to $(D-d)/2 \leq 0.1$ mm.

Armature coil 13 is wound on every magnetic pole 10. In this embodiment, for example, 4 poles each are successively wound. The beginning and end of the armature coils 13 are driven through previously mentioned small holes 132 each of which is connected by coiling around pins 138. Under these circumstances, the outer edge 136 of the lower part of the previously mentioned inner frame 130 is a path of connected leads between adjourning armature coils. Grooves 137 in inner frame 130 as shown in FIG. 6 is also a path in which the beginning and end of coils the armature coils 13 are wired to pins 138.

Then armature coils 13, at the end of the winding process, are applied for preventing loosening of the winding varnish, and since the coil wire's lead wire is routed on a lower part of inner frame 130 and is joined to the end of the coil wire through the groove to pin 138, very durable armature coils can be obtained.

Figure 9:
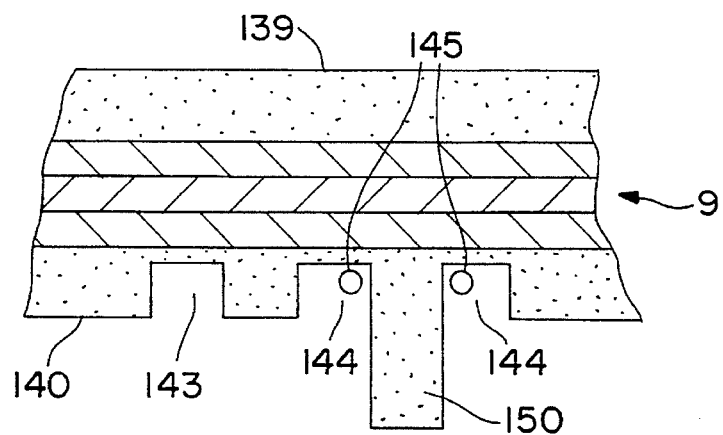
FIG. 9 is a partial cross-sectional view according to a second embodiment of the present invention.

As shown in FIG. 1, small holes 16 are provided to insert a boss 15 (for positioning and securing the stator core 12) into the motor base plate 1. During flat motor assembly, after the armature coil winding 13 is wound, the boss 15 of stator core 12 are inserted into the small holes 16 of the motor base plate 1 combined along with electronic parts. After glueing or melting the face of boss 15, the stator core 12 adheres to motor base plate 1. Installation of electrical wiring, including installing the tip of the coil into the motor base plate 1 and connecting the terminal is carried out. Then center 6 of the auto-rotor 5 is inserted into the axle 2, with fitting of a C-ring 100 (FIG. 1) on the tip of axle 2, the assembly of the motor is completed. In the above embodiment, the bosses 15 are located on top of a flat inside support of the inner surface of the stator core 12. However, it is also possible, that as shown in FIG. 9, on the flat inner surface support terminal insert 144 having a short wide groove connected to the outer surface from the inner surface of stator core 12 is formed. An elongated hub 150 is installed inside terminal insert 144. The hub 150 is utilized for positioning as well as for securing the armature coil end 145.

As explained in detail, according to the present invention insulation is installed on the outer surface of a magnetic pole. The magnetic pole is thicker than the electrode. Because of this, when the armature coil of the magnetic pole is wound, the armature coil is constructed such that the wire does not touch the corners of the magnetic pole. Accordingly, the wire is prevented from touching, the magnetic pole thin layer installation does not break down and the wire does not directly contact the inner or outer surface. Therefore, although the stator core is sufficiently thin, it can be secured so that there is sufficient insulation space between the magnetic pole gap and the armature coil. Furthermore the beginning and end of the armature coil winding are coiled around pins, so that the armature coil will not loosen when longitudinal pulling force occurs. Consequently the motor assembly becomes much simpler.

What is claimed is:

1. A stator unit with a flat motor, an armature coil is wound on a plurality of magnetic poles arranged protrusively in a circular shape from a ring-shaped yoke made of a strongly magnetized material, comprising:

a stator core;

insulation layers, formed by an insertion mold process, including a winding of said stator core of the magnetic poles on both sides of said stator core, said insulation layers having a thin portion formed on top and bottom middle portions of the magnetic poles and having a portion, thicker than the thin portion, formed on both sides of the magnetic poles.

2. A stator unit with a flat motor according to claim 1, wherein said insulation layer of the stator core has a thickness of $(D-d)/2 \leqq 0.1$ mm, where D is a vertical height and d is a longitudinal thickness.

3. A stator unit with a flat motor according to claim 1, wherein on an inner surface of the stator core, a boss is protrusively provided for positioning and securing said stator core.

4. A stator unit with a flat motor according to claim 1, further comprising a terminal for a coil, said terminal for a coil is located inside said stator core.

5. A stator unit with a flat motor according to claim 4, wherein the terminal for the coil is flat.

6. A stator unit with a flat motor according to claim 1, wherein on an inner surface of said stator core, a boss is provided for securing an end of the armature coil.

7. A stator unit with a flat motor according to claim 1, wherein on an inner surface of said stator core, a boss is provided for securing an end of the armature coil and positioning said stator core.

* * * * *

UNITED STATES PATENT AND TRADEMARK OFFICE
CERTIFICATE OF CORRECTION

PATENT NO. : 5,508,578

DATED : April 16, 1996

INVENTOR(S) : Yuzuru SUZUKI, et al.

It is certified that error appears in the above-indentified patent and that said Letters Patent is hereby corrected as shown below:

Column 1, line 21, no paragraph indentation;
    line 27, insert --,-- after "Also";
    line 33, insert --,-- after "Sometimes";

line 36, delete "a"; and
    line 43, insert --,-- after "applied".

Column 2, line 49, delete "is arranged";
    line 51, change "-housing" to --having--;
    line 53, insert --the-- after "of"; and
    line 55, insert --6-- after "bearing".

Column 3,
    line 36, insert --stator-- after "the"; delete "shows" and insert therefor --is--;
    line 38, delete ",";

line 56, insert --upper and lower-- after "the", second occurrence;
    line 57, insert --compared with-- after "small";
    line 58, change "$\leq$" to --$\leq$--;
    line 67, insert --13-- after "coils".

UNITED STATES PATENT AND TRADEMARK OFFICE
CERTIFICATE OF CORRECTION

PATENT NO. : 5,508,578
DATED : April 16, 1996
INVENTOR(S) : Yuzuru SUZUKI, et al.

It is certified that error appears in the above-indentified patent and that said Letters Patent is hereby corrected as shown below:

Column 4, line 2, delete "coils";
line 5, change "," to --.--;
line 6, change "and since" to --Since--;
line 16, delete "combined"

line 20, insert --bearing-- after "center";
line 21, change ", with" to --. With the--;
line 27, insert --140, a-- after "support"; and
line 30, insert --the-- after "inside".

Column 5, line 1, change "$\leq$" to --$\leq$--.

Signed and Sealed this

Third Day of September, 1996

Attest:

BRUCE LEHMAN

Attesting Officer

Commissioner of Patents and Trademarks